United States Patent Office 3,798,309
Patented Mar. 19, 1974

3,798,309
PROCESS FOR RECOVERING SULFUR DIOXIDE FROM GASES USING AQUEOUS SALT SOLUTION OF GLUTARIC ACID
William S. Knowles and Sabet Abdou-Sabet, St. Louis, Mo., assignors to Monsanto Company, St. Louis, Mo.
No Drawing. Continuation of abandoned application Ser. No. 2,585, Jan. 19, 1970. This application July 31, 1972, Ser. No. 276,350
Int. Cl. B01d 53/34
U.S. Cl. 423—243
10 Claims

ABSTRACT OF THE DISCLOSURE

Gases containing sulfur dioxide, such as flue gases, are passed into effective contact with an absorbent liquid comprising an aqueous solution of a water-soluble alkali metal or amine salt of a polybasic acid at a temperature below about 90° C. to effect removal of sulfur dioxide from the gases and, if desired, the sulfur dioxide is thereafter recovered by heating the organic salt solution in which it is dissolved to a temperature in excess of about 90° C.

This is a continuation of application Ser. No. 2,585, filed Jan. 19, 1970, now abandoned.

BACKGROUND OF THE INVENTION

Field of the invention

Gas streams containing sulfur dioxide are generated in several different ways, two of the most important of which are by roasting pyrite ores and by the burning of fossil fuels. Sulfur dioxide concentration in the off-gases generated by the roasting of pyrite ores is relatively high, and it has long been the practice to recover at least a portion of the sulfur dioxide in such gases for the manufacture or sulfuric acid, but in almost all such recovery procedures, the removal of sulfur dioxide is incomplete and gases containing dilute but objectionable concentrations of sulfur dioxide are released to the atmosphere. The sulfur dioxide concentration in combustion gases created by the burning of fossil fuels is relatively low, and such combustion gases are not, for economic reasons, at the present time usually processed for the recovery of sulfur dioxide. As a result, many tons of sulfur dioxide are released to the atmosphere daily, and in some areas, this has resulted in a severe atmospheric pollution problem. In addition, it has resulted in the substantial complete waste of enough sulfur dioxide to satisfy a sizable portion of the world demand for this valuable raw material. Therefore, a satisfactory process for recovering sulfur dioxide from gases, such as combustion gases and the off-gases from ore roasting operations, would be a meritorious advance in the art.

Description of the prior art

Because of the high levels of atmospheric pollution which have been generated in recent years by the release of sulfur dioxide to the atmosphere and because of the worldwide need for economical sources of sulfur dioxide, efforts have been made for many years to devise efficient, inexpensive procedures for recovering sulfur dioxide from gas streams. Many procedures for scrubbing gas streams with aqueous liquids have been suggested, but because of the low solubility of sulfur dioxide in hot water, the use of pure water is not completely satisfactory. For this reason, various other absorbents have been tried. Absorbents containing organic bases from which sulfur dioxide could be recovered were tried many years ago, and a procedure employing such an absorbent liquid is suggested in U.S. Pat. No. 1,972,074. Such procedures were not accepted commercially because of the high loss of expensive organic materials and for other reasons, and in more recent years, emphasis has been placed upon using a chemically reactive aqueous mixture for recovering the sulfur dioxide as a sulfite, bisulfite or the like. The latter type of procedure, however, has not been accepted commercially, possibly for the reason that it does not offer the advantages of an all liquid system. Additionally, such systems have the disadvantage that sulfites are readily oxidized to sulfates which creates a disposal problem and results in the loss of a sizable percentage of the desired sulfite material.

Still another procedure which has been suggested and actually tried on a limited commercial scale comprises absorbing sulfur dioxide in a solid absorbent material such as dolomite, but none of the solid absorbent processes has achieved any degree of commercial success, possibly because the sulfur dioxide is not recovered in a usable form and the disposal of the solid absorbent creates almost as big a problem with respect to pollution as releasing the sulfur dioxide to the atmosphere. It has also been suggested that the sulfur dioxide in gases containing dilute concentrations thereof be catalytically transformed into sulfur trioxide which can then be recovered as sulfuric acid or oleum, and a catalytic oxidation procedure of this type has been used with some degree of success. The capital expenditure for such a plant, however, is quite large and frequently cannot be justified solely on the value of the sulfuric acid produced. There has, therefore, prior to the present invention, been available no completely satisfactory procedure for recovering sulfur dioxide from gas streams containing the same in dilute concentrations.

SUMMARY OF THE INVENTION

In accordance with the present invention, the disadvantages of the prior art processes are avoided and sulfur dioxide is efficiently and inexpensively recovered from gas streams containing the same in dilute concentrations by passing the gases into effective interfacial contact at a temperature below about 90° C. with a liquid comprising a concentrated aqueous solution of a water-soluble alkali metal or amine salt of a dibasic acid, such as glutaric acid, whereby the sulfur dioxide is absorbed by the aqueous liquid. The pregnant aqueous liquid is then heated to a temperature above about 90° C. and preferably to approximately its boiling point to effect release of a relatively concentrated mixture of sulfur dioxide which can then be dried and the sulfur dioxide recovered as such or as another sulfur compound.

It is an advantage of the invention that exceedingly dilute gas streams can be effectively processed and that the recovery efficiency is quite high so that the gases released to the atmosphere contain sulfur dioxide in concentrations so low as to normally be considered unobjectionable. It is another advantage of the invention that the percentage of the sulfur dioxide which is unavoidably oxidized to result in sulfate formation can be exceedingly low so that sulfate disposal problems and the resulting loss in efficiency are avoided. Further advantages of the invention are that it is an all liquid absorption system employing a high capacity liquid absorbent and that it permits the use of simple absorption equipment. It is a still further advantage of the invention that the loss of organic materials used as absorbents can be so low as to be well within economic limits.

BRIEF DESCRIPTION OF THE DRAWING

The drawing schematically illustrates by means of a flow diagram a typical arrangement in accordance with the present invention. If the original gas stream contains particulate matter, the system can include in addition to the equipment schematically illustrated, an electrostatic precipitator or the like to remove solid material prior to the gases being processed.

DESCRIPTION OF THE PREFERRED EMBODIMENTS

It is necessary in most instances in accordance with the invention as a first step to cool the gases to be processed to a satisfactory operating temperature and, with reference to the drawing, sulfur dioxide containing gases in accordance with the illustrated embodiment are introduced through a conduit 10 into a cooler schematically illustrated at 12. The gas stream can be derived from any suitable source and may, for example, constitute combustion gases from a coal or oil fired furnace or may constitute smelter gases from which a large percentage of the sulfur dioxide has already been removed. This is not to say, however, that a process in accordance with the present invention cannot satisfactorily be employed with gases which contain high percentages of sulfur dioxide and, for example one, can satisfactorily employ gases containing as much as 20% or even 90% sulfur dioxide by volume in accordance with the present invention, but since processes are already available for economically recovering sulfur dioxide from gas streams from which it is present in high concentrations, the process of the present invention will in most instances be used for processing gas streams in which sulfur dioxide is present in concentrations below about 5% by volume. At the lower end of the scale, the process of this invention can be employed to recover sulfur dioxide from gas streams containing the same in exceedingly minute quantities and, for example, can be effectively employed to recover sulfur dioxide from gas streams containing the same in amounts as small as about 0.01% by volume. However, treating such dilute gas streams in most instances cannot be justified from either an air pollution or an economic point of view, and in normal practice it is seldom desirable to utilize gas streams containing less than about 0.05% to about 0.3% sulfur dioxide by volume.

As mentioned above, if the gas stream is one produced by the burning of a material which produces large quantities of fly ash or other solid particulate matter, it is desirable in some instances to pass the gas stream through an electrostatic precipitator or the like prior to introducing it into the cooler. This is particularly true when the process of the present invention is employed with an existing plant, and it is possible to continue use of an existing electrostatic precipitator to reduce the particulate matter in the gas stream below about 0.5 and preferably below 0.01 grain of solids per standard cubic foot of flue gas. The use of an electrostatic precipitator or the like is not always necessary or even desirable, however, if provision is made for removing particulate matter in the cooling and/or extracting operations conducted in accordance with the present invention.

The cooler 12 may be of any suitable type and, for example, may constitute a conventional heat exchanger of the tubular variety used to recover for any suitable purpose a portion of the available heat in the gases being processed. If the gases being fed to the cooler contain substantial quantities of particulate matter, it is frequently advantageous to employ a spray type cooler with a recirculating liquid being passed through a settling pond. With this arrangement, the spray can serve to remove at least a portion of the particulate matter in the gases while simultaneously effecting cooling of the gases to a satisfactory temperature. If desired, the circulating liquid can also be passed through one or more heat exchangers to recover at least a portion of the available heat in the gases being processed.

The gases to be processed should be cooled to a temperature of about 90° C. or less in cooler 12 because this is about the maximum temperature at which one can in most instances satisfactorily recover an acceptable portion of the sulfur dioxide present in the gas stream. From the point of view of sulfur dioxide recovery, it is best to cool the gases to as low a temperature as is feasible in the cooler 12 and, for example, if the only thing to be considered were sulfur dioxide recovery, it would be preferable to cool the gases in cooler 12 to a temperature of 20° C. or even 0° C., but this is normally not economically advantageous. All factors considered, the most advantageous temperature to which the gases can be cooled in cooler 12 is that temperature where the sulfur dioxide in the gas stream can be reduced to a level which is unobjectionable from a pollution point of view and below which it is not economically justifiable to endeavor to effect further recovery. This level, of course, will vary depending upon circumstances, but in most instances, the most advantageous temperature for the gases exiting cooler 12 is from 40° C. to 70° C.

From cooler 12, the gases are passed through a conduit 14 to a scrubber 16 where the gases are brought into effective interfacial contact with a liquid absorbent comprising an aqueous solution of a water-soluble salt of a dibasic acid of a type hereinafter to be more precisely specified. The scrubber 16 can be of any suitable conventional type and, for example, in its simplest form, can constitute a packed tower with means for spraying the absorbent into the top of the tower in countercurrent flow to the sulfur dioxide containing gases introduced near the bottom of the scrubber. The more efficient the scrubber in effecting contact of the gases with the absorbent liquid, the better, and if desired, a plurality of scrubbers of various varieties may be employed to achieve maximum gas liquid interfacial contact.

The gas/absorbent ratio can be varied within wide limits, but if one desires to achieve substantially complete removal of the sulfur dioxide from the gases being processed, the ratio should be such as to provide at least about 0.4 and preferably at least about 1 to 2 mols of acid salt for each mol of sulfur dioxide in the gases being processed. If the molar ratio of acid salt to sulfur dioxide is less than about 0.4, the absorption system will not have the capacity necessary for removal of a major portion of the sulfur dioxide present in the gases, and while this may be desirable in some instances, in most instances, it is desired to reduce the sulfur dioxide content to a relatively low level. While applicants do not wish to be bound by any chemical theory, it is believed that the absorbent removes sulfur dioxide as a result of the occurrence of the following chemical reaction:

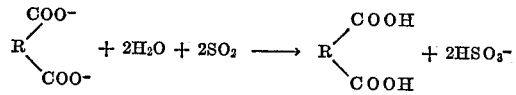

Based upon this reaction, it will be seen that theoretically one mol of the salt of the dibasic acid is required for reaction with two mols of sulfur dioxide so that if the molar ratio is less than 0.5, one would not even in theory expect complete removal of the sulfur dioxide. A large excess of the acid salt over that theoretically required can satisfactorily be employed if desired and, in fact, it is usually advantageous to employ at least a twofold to fourfold excess. There is no upper limit as to the amount of absorbent that can be employed except that dictated by prudence, and if desired, one can employ a tenfold or a several hundredfold excess of the acid salt over that theoretically required.

There may be employed in accordance with this invention salts of dibasic acids of the following formula:

$$HOOC—X—CCOH$$

wherein X is a divalent connecting radical selected from the group consisting of $—CH_2O—CH_2—$,

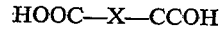

and divalent hydrocarbon radicals having from 1 to 5 carbon atoms as illustrated by $—(CH_2)_n—$ wherein $n$ is an integer from 1 to 5, $—CH_2—CH(CH_3)—CH_2—$.

From functional and economic points of view, salts of glutaric acid are greatly preferred. Glutaric acid is relatively inexpensive and salts of this acid provide a solution which not only readily absorbs sulfur dioxide but one from which sulfur dioxide can be readily recovered. Other dibasic acids, the salts of which can be satisfactorily employed, include diglycolic acid, thiodiglycolic acid, beta methyl adipic acid, malonic acid, succinic acid, and pimelic acid. It is an advantage of the invention that crude mixtures of dibasic acids can be employed and, for example, a mixture of dibasic acids produced as a by-product in the manufacture of adipic acid and comprising from about 50% to 98% glutaric acid, from about 1% to 25% succinic acid, and from about 1% to 25% adipic acid is from a cost performance basis a preferred acid composition for use in preparation of the salts solutions of this invention.

As will be seen from the equation set forth above, the cation provided by ionization of the dibasic acid salt is not believed to play any part in the reaction and one might conclude in view of this that any salt of the acid would be satisfactory. It has been found, however, that many salts do not give satisfactory results. Salts of acids of the above formula which can be used in accordance with this invention are then sodium salts, potassium salts, quaternary ammonium salts, and salts of amines having a $K_b$ of $1 \times 10^{-4}$ to $16 \times 10^{-4}$. Examples of quaternary ammonium salts which can be employed are tetramethylammonium, tetraethylammonium, and other lower alkyl quaternary ammonium salts of dibasic acids of the above formula. Examples of amines, the salts of which are suitable, include primary alkyl amines having from 1 to 5 carbon atoms such as ethylamine and isopropylamine; secondary amines having from 2 to 5 carbon atoms such as diethylamine and dimethylamine; certain tertiary amines such as triethylamine; polyamines such as diethylene triamine, hexamethylene diamine and triethylene diamine; and heterocyclic amines such as quinuclidine, piperidine, pyrrolidene, and hexamethyleneimine. While almost any amine providing the proper basicity can be employed, there are many other factors involved such as solids formation, solubility, and volatility so that the preferred amines are those which not only have a proper $Pk_b$ but which also form salts with the dibasic acid which are highly soluble, form a system which can absorb substantially the theoretical amount of sulfur dioxide without solids formation and which have an exceedingly low vapor pressure so that loss of the amine during stripping of the sulfur dioxide from the pregnant liquor is held to a minimum.

While certain salts having the desirable qualities mentioned above can be satisfactorily employed under a wide variety of conditions, the preferred salt for a particular set of operating conditions depends upon a number of factors, one of the most important of which is the concentration of sulfur dioxide in the gas stream. If the volume of gas to be processed is small and the concentration of sulfur dioxide in the gas is correspondingly high, the preferred salt for use in accordance with this invention is a salt of glutaric acid with an amine having the desirable qualities mentioned in the preceding paragraph as illustrated by diethylene triamine. The use of this amine decreases to a near minimum the amount of sulfate formed in the process and permits the use of exceedingly concentrated aqueous solutions of the salt without any solids formation. If on the other hand one desires to process large volumes of gas containing only a low concentration of sulfur dioxide, the preferred organic acid salt for use in accordance with this invention is the di-sodium salt of glutaric acid or a mixture of the di-sodium and mono-sodium salts necessary to provide the proper pH in the aqueous absorbent solution. This is because even with only slightly volatile amines, there is some reagent loss, and if it is necessary to treat exceedingly large volumes of gases, the use of any amine salt in accordance with this invention can result in sufficient loss of reagent to detract from the economics of the process. When using the di-sodium salt of glutaric acid, however, reagent loss is exceedingly low even when treating large quantities of gases containing only very small quantities of sulfur dioxide. If the gas to be processed contains an amount of sulfur dioxide within the range of from about 0.1% to about 5% by volume, it is sometimes advantageous to employ a mixture of sodium and diethylene triamine or hexamethylene diamine salts so that the molar ratio or sodium glutarate to amine salt is from about 1:10 to 10:1.

The concentration of the aqueous solution of dibasic acid salt can vary within reasonable wide limits with the optimum concentration depending upon the particular salt employed. As a general rule, it is desirable to employ a solution as concentrated as can be employed without the generation of solids since this reduces to a minimum the quantity of the liquid which must be handled. When employing aqueous solutions of methylamine salt of glutaric acid under otherwise preferred conditions, about an 80% by weight solution of the salt can satisfactorily be employed and even though this results in less than 10% free water being present in the solution when it has absorbed the maximum possible amount of sulfur dioxide, no solids are generated. With the di-sodium salt of glutaric acid, the formation of solids is frequently encountered when a solution more concentrated than about 40% by weight is employed so that it is not usually advantageous when using this salt to employ a concentration in excess of about 40%. The concentration at which solids are formed when employing other salts ranges from about 20% to about 80% and the maximum concentration which can be employed without solids formation when employing any particular salt under any specific condition can readily be determined by trial and error. It is, of course, not necessary to use the most concentrated solutions which can be employed, and if one desires to avoid determining the maximum concentration which can satisfactorily be employed in any particular instance, one can simply utilize a 20% or 30% solution. In fact, the use of a dilute solution, while having the disadvantage that might be expected in view of the above, has the advantage that it facilitates sulfur dioxide recovery from the pregnant liquor. It is, however, seldom, if ever, advantageous to employ a solution which contains less than about 10% by weight of the polybasic acid salt.

The aqueous solution can contain free acid or free base as long as the amount of free acid or free base present in the solution is insufficient to result in the solution have a pH outside the range of about 4 to 8. If the pH of the solution as initially tested is outside this range, it should be brought to within the range by the addition of acid or base, as appropriate. The preferred initial pH of the solution is usually from about 5 to 7.

The clean gases from scrubber 16 are passed through a conduit 18 to a mist eliminator 20 which can be of any suitable type but is preferably a glass fiber packed mist eliminator such as is sold by Monsanto Company under the trademark "Brink." The mist eliminator 20 removes from the gas stream any microscopic liquid particles which are entrained in the gas as it leaves scrubber 20 and is necessary to avoid excessive reagent loss and to reduce atmospheric pollution to a near minimum. From mist eliminator 20, the clean gases are passed to the atmosphere through a conduit 22.

If the only consideration is atmospheric pollution, the absorbent from scrubber 16 may simply be discarded but in almost all instances it is desirable to regenerate the absorbent and recover the absorbed sulfur dioxide. To effect this, liquid collected in mist eliminator 20 is passed through a conduit 24 to a conduit 26 connecting scrubber 16 with a heat exchanger 28 and through which the pregnant liquid is withdrawn from the scrubber. In heat exchanger 28, the pregnant liquor recovered from scrubber 16 and mist eliminator 20 is heated to a temperature of at least about 90° C. and is passed through a conduit 30 to a sulfur dioxide regenerator 32.

Sulfur dioxide regenerator 32 can comprise any suitable type of equipment for creating a liquid vapor interface of large area and, for example, can suitably comprise an enclosed series of superimposed tray members over which thin films of the pregnant liquor can be passed at an elevated temperature between about 90° C. and the boiling point of the liquor. In most instances the pregnant liquor at this point in the process is preferably at a temperature of from about 95° C. and 110° C. A steam generator 34 is provided for the generation of steam which can be passed through a conduit 36 to the sulfur dioxide regenerator 32 and passed in interfacial contact with the thin films of pregnant liquor in the regenerator to assist in sulfur dioxide recovery and to sweep the released sulfur dioxide from the generator.

Steam and released sulfur dioxide from regenerator 32 are passed through a conduit 38 to a condenser 40 where water vapor is condensed and returned through a conduit 42 to steam generator 34. The sulfur dioxide is then passed to a drier 44 through conduit 46 where it is dried and is then passed through a conduit 48 to storage or a catalytic converter for the production of sulfuric acid.

Liquid from regenerator 32 containing the dibasic acid salt is passed through a conduit 50 to a storage vessel 52 from which it can be recirculated through a conduit 54 to scrubber 16. Make-up water should be added to result in the recycled solution having a proper concentration and periodic pH checks should be made of the solution. If necessary, base or acid can be added to return the pH to the desired range.

Having thus described our invention and several embodiments thereof, what we desire to claim and secure by Letters Patent is:

1. A method for removing sulfur dioxide from gases containing the same which comprises bringing said gases into interfacial contact with an aqueous salt solution containing at least about 10% by weight of a salt of glutaric acid to thereby result in sulfur dioxide being absorbed in said salt solution, said solution being at a temperature of less than about 90° C. and having a pH within the range of about 4 to 8, and the cationic moiety of said salt or salts being selected from the group consisting of sodium and amines having a $K_b$ of from about $1 \times 10^{-4}$ to $16 \times 10^{-4}$.

2. A method according to claim 1 wherein said glutaric acid salt solution having sulfur dioxide dissolved therein is subsequently heated to a temperature to above about 90° C. to result in the release of sulfur dioxide and the sulfur dioxide thus released is recovered.

3. A method according to claim 2 wherein the sulfur dioxide containing solution is heated to a temperature within the range of from about 95° C. to 110° C. to effect release of sulfur dioxide.

4. A method according to claim 1 wherein said salt material is a sodium salt of glutaric acid.

5. A method according to claim 3 wherein said salt is a salt of glutaric acid with diethylene triamine.

6. A method according to claim 2 wherein said liquid with which said sulfur dioxide containing gas is contacted at a temperature of from about 40° C. to 70° C.

7. A method according to claim 6 wherein said salt solution with which said sulfur dioxide containing gas is contacted at a pH of from about 5 to 7.

8. A method according to claim 7 wherein said salt consists essentially of a sodium salt of glutaric acid.

9. A method according to claim 7 wherein said salt consists essentially of diethylene triamine salt of glutaric acid.

10. A method according to claim 7 wherein said salt consists essentially of a mixture of sodium and amine salts of glutaric acid.

References Cited

UNITED STATES PATENTS

| | | | |
|---|---|---|---|
| 2,176,441 | 10/1939 | Ulrich | 23—2 |
| 1,951,992 | 3/1934 | Perkins | 23—2 |
| 2,142,987 | 1/1939 | Bacon | 23—178 |
| 2,139,375 | 12/1938 | Miller | 23—2 |
| 1,783,901 | 12/1930 | Bottoms | 23—178 |

FOREIGN PATENTS

| | | |
|---|---|---|
| 479,630 | 2/1938 | Great Britain. |
| 400,998 | 11/1933 | Great Britain. |
| 396,027 | 10/1931 | Great Britain. |

NORMAN YUDKOFF, Primary Examiner

S. J. EMERY, Assistant Examiner

U.S. Cl. X.R.

55—73; 23—312 R